Feb. 29, 1944.                L. G. RILEY                2,342,756
                         DYNAMIC BRAKING SYSTEM
                          Filed Oct. 30, 1942
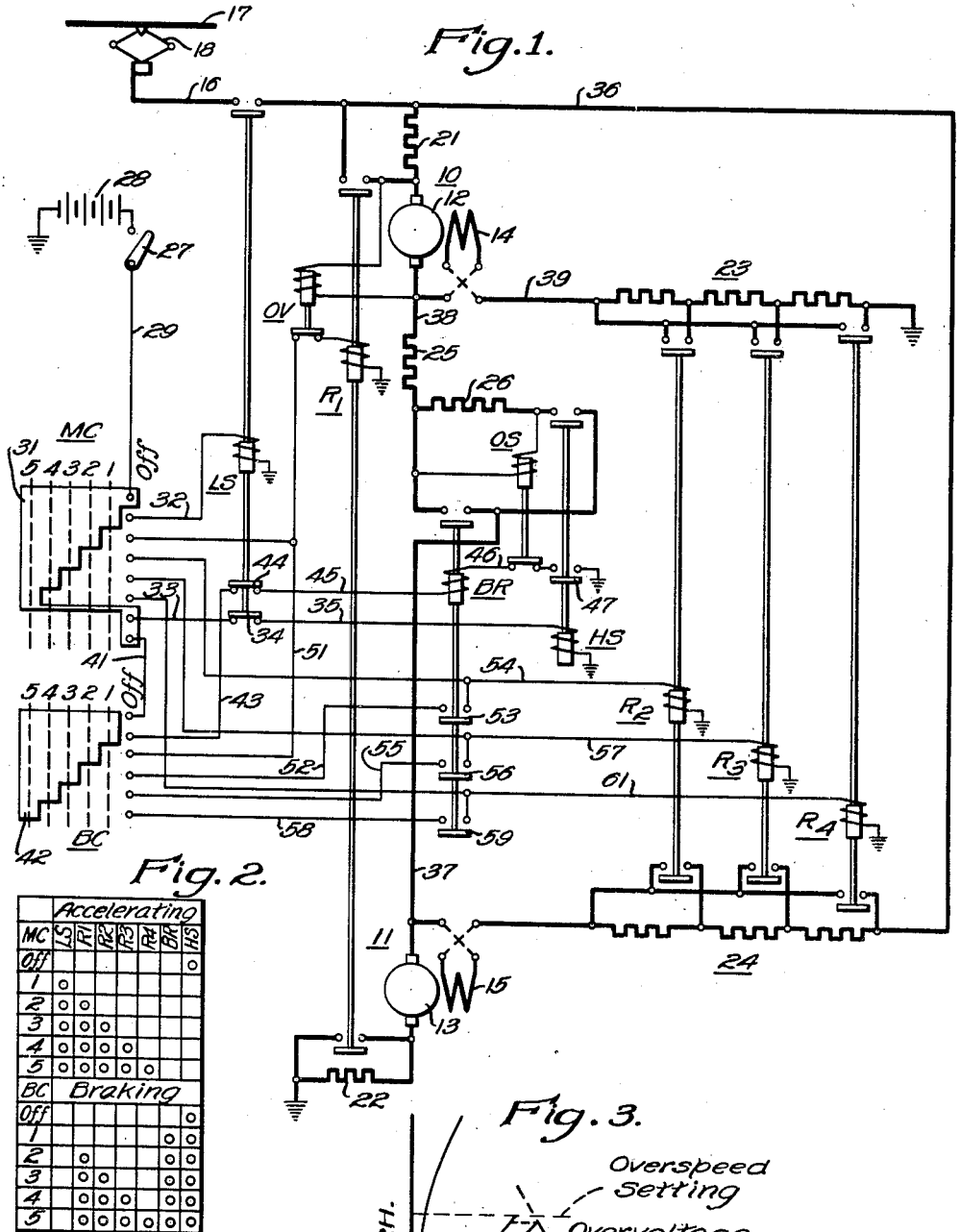
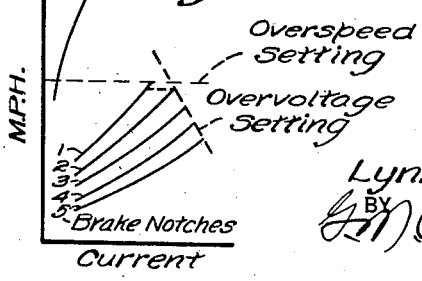
WITNESSES:
Robert C. Baird
INVENTOR
Lynn G. Riley.
BY
                ATTORNEY Patented Feb. 29, 1944

2,342,756

UNITED STATES PATENT OFFICE 2,342,756

DYNAMIC BRAKING SYSTEM

Lynn G. Riley, Pittsburgh, Pa., assignor to Westinghouse Electric & Manufacturing Company, East Pittsburgh, Pa., a corporation of Pennsylvania Application October 30, 1942, Serial No. 463,982

13 Claims. (Cl. 172—179)

My invention relates, generally, to control systems and, more particularly, to systems for controlling the dynamic braking of electric vehicles by the propelling motors of the vehicles.

When dynamic braking is applied for service use over a limited range of speed of a vehicle, such as an electric locomotive, it is not economical to include switching and resistor equipment to provide sufficient braking notches or steps to cover the entire range up to the maximum safe speed of the vehicle. Therefore, protection for the traction motors against overloading and overvoltage at the higher speeds is necessary.

An object of my invention is to prevent overloading the traction motors of an electric vehicle during dynamic braking of the vehicle.

Another object of my invention is to protect the traction motors of an electric vehicle against overvoltage during dynamic braking of the vehicle.

A more general object of my invention is to provide a dynamic braking control system for an electric locomotive which shall be simple and efficient in operation and which may be economically manufactured and installed.

Other objects of my invention will be explained fully hereinafter or will be apparent to those skilled in the art.

In accordance with one embodiment of my invention, an overspeed relay is provided which prevents the application of the dynamic brake above a predetermined speed of the locomotive, thereby preventing overloading of the motors and the braking resistors by an excessive braking current. An overvoltage relay is utilized to insert resistance in the braking circuit if the speed tends to increase after the dynamic brake has been applied.

For a fuller understanding of the nature and objects of my invention, reference may be had to the following detailed description, taken in conjunction with the accompanying drawing in which:

Figure 1 is a diagrammatic view of a control system embodying my invention;

Fig. 2 is a chart, showing the sequence of operation of a part of the equipment illustrated in Fig. 1, and Fig. 3 is a set of curves illustrating the operation of the system herein described.

Referring to the drawing, the system shown therein comprises a pair of traction motors 10 and 11 having armature windings 12 and 13 and series field windings 14 and 15, respectively. The power for operating the motors may be supplied through a power conductor 16 which is connected to an overhead trolley 17 through a pantograph current collector 18. A line switch LS is provided for connecting the motors 10 and 11 to the power conductor 16.

In accordance with the usual practice, a plurality of resistors 21, 22, 23 and 24 are provided for controlling the motor current during both acceleration and dynamic braking of the vehicle driven by the motors 10 and 11. In addition to the foregoing, resistors 25 and 26 are provided for controlling the motor current during dynamic braking of the vehicle. A resistor-shunting switch $R_1$ is provided for shunting the resistors 21 and 22 from the motor circuit and resistor-shunting switches $R_2$, $R_3$ and $R_4$ are provided for shunting the resistors 23 and 24 step-by-step. A switch BR is provided for shunting the resistor 26, as will be explained more fully hereinafter. The operation of the resistor-shunting switches during acceleration of the vehicle may be controlled in the usual manner by a master controller MC. During dynamic braking of the vehicle the operation of the switches may be controlled by a braking controller BC.

In order to protect the motors and the resistor equipment against overloading by the application of the dynamic brake at higher speeds than the speed for which the equipment is designed, a relay OS is provided for preventing the application of the dynamic brake above a predetermined speed of the vehicle. As shown, the actuating coil of the relay OS is connected across the resistor 26 which is connected in the dynamic braking circuit established by a switch HS during coasting of the vehicle.

The switch HS is closed upon the operation of the master controller MC to the "off" position. The closing of the switch HS sets up the usual dynamic braking circuit in which the armature winding 12 of the motor 10 is connected across the field winding 15 of the motor 11 and the armature winding 13 of the motor 11 is connected across the field winding 14 of the motor 10. However, sufficient resistance is included in the dynamic braking circuit to limit the motor current to a relatively small amount. Therefore, no appreciable braking effect is produced upon the establishment of the dynamic braking circuit.

However, the circulating current in the motor circuit is proportional to the motor speed and the relay OS, the actuating coil of which is connected across the resistor 26, is, therefore, responsive to the circulating current which is a function of the motor speed. Accordingly, the relay OS is responsive to the speed of the vehicle.

The contact members of the relay OS are so connected in the control circuit that the operation of the resistor-shunting switches to increase the dynamic braking effect by the shunting of resistance from the motor circuit is prevented until the locomotive speed is reduced sufficiently to permit the closing of the contact members of the relay OS. It will be understood that the locomotive speed may be controlled by the usual air brake or other well known braking systems.

In order to protect the equipment in the event that the speed of the vehicle should increase after the dynamic brake has been applied, a relay OV is provided for increasing the resistance in the motor circuit. The actuating coil of the relay OV is connected across the armature 12 of the motor 10 and is, therefore, responsive to the voltage of this motor. The contact members of the relay OV are connected in the energizing circuit for the actuating coil of the resistor shunting switch R1. Accordingly, as the voltage of the motor 10 increases sufficiently to operate the relay OV, the switch R1 is opened to insert the resistors 21 and 22 in the motor circuit, thereby reducing the current in the circuit for both motors. In this manner the equipment is protected against overloading as a result of the application of the dynamic brake above a predetermined speed and is also protected against overvoltage in the event that the speed increases after the application of the dynamic brake.

In order that the functioning of the foregoing apparatus may be more clearly understood the operation of the system will now be described in more detail. Assuming that a switch 27 has been closed to connect a battery 28 to the controller MC through a conductor 29, the vehicle may be accelerated by actuating the controller MC to position 1 to close the switch LS, thereby connecting the motors 10 and 11 across the power source in parallel-circuit relation. The energizing circuit for the actuating coil of the switch LS may be traced from the battery 28, through the switch 27, conductor 29, contact segment 31 of the controller MC, conductor 32 and the actuating coil of switch LS to ground.

The motors may be accelerated in the usual manner by actuating the controller through positions 2, 3 and 4 to position 5 to operate the switches R1, R2, R3 and R4 in sequential relation to shunt the resistors 21, 22, 23 and 24 from the motor circuits in a step-by-step manner well known in the art.

As explained hereinbefore, as the controller MC is returned to the "off" position the switch LS is opened to disconnect the motors from the power source and the switch HS is closed to set up the dynamic braking circuit for the motors. The energizing circuit for the actuating coil of the switch HS may be traced from the controller MC through conductor 33, an interlock 34 on the switch LS, conductor 35, and the actuating coil of the switch HS to ground.

The closing of the switch HS establishes a dynamic braking circuit for the motor 10 which may be traced from the armature winding 12 through the resistor 21, conductor 36, the resistor 24, the field winding 15 of the motor 11, conductor 37, the switch HS, the resistors 26 and 25 and conductor 38 to the armature winding 12. The dynamic braking circuit for the motor 11 may be traced from armature winding 13 through conductor 37, the switch HS, the resistors 26 and 25, conductor 38, the field winding 14 of the motor 10, conductor 39, the resistor 23 and thence through the ground connection and the resistor 22 to the armature winding 13.

As explained hereinbefore, in view of the relatively high amount of resistance connected in the dynamic braking circuits only a relative small current is permitted to circulate through the motors while the vehicle is coasting. If it is desired to apply the dynamic brake to retard the movement of the vehicle, the controller BC is actuated to position 1 to operate the switch BR to apply the dynamic brake by shunting the resistor 26, which has a relatively high value of resistance, from the dynamic braking circuit.

However, the operation of the switch BR will be prevented by the relay OS if the vehicle is operating above a predetermined speed, thereby preventing the application of a dynamic brake, illustrated in Fig. 3 and as explained hereinbefore. Assuming that the speed of the vehicle is sufficiently low to permit the contact members of the relay OS to remain closed, the energizing circuit for the switch BR may be traced from the controller MC through conductor 41, a contact segment 42 of the controller BC, conductor 43, an interlock 44 on the switch LS, conductor 45, the actuating coil of the switch BR, conductor 46, the contact members of the relay OS and an interlock 47 on the switch HS to ground.

The operation of the switch BR to shunt the resistor 26 from the dynamic braking circuit causes the application of the dynamic brake by permitting sufficient current to flow through the motors to produce a dynamic braking effect. The dynamic brake may be controlled in the usual manner by operating the controlled BC through positions 2, 3, 4 and 5 to operate the switches R1, R2, R3 and R4 in sequential relation to shunt the resistors 21, 22, 23 and 24 from the motor circuit as the speed of the vehicle is reduced. The energizing circuit for the switch R1 may be traced from the controller BC, through conductor 51, the contact members of the relay OV and the actuating coil of the switch R1 to ground. The energizing circuit for the switch R2 extends from the controller BC through conductor 52, an interlock 53 on the switch BR, conductor 54, and the actuating coil of the switch R2 to ground. The energizing circuit for the switch R3 extends from the controller 42 through conductor 55, an interlock 56 on the switch BR, conductor 57 and the actuating coil of the switch R3 to ground. The energizing circuit for the switch R4 may be traced from the controller 42, through conductor 58, an interlock 59 on the switch BR, conductor 61 and the actuating coil of the switch R4 to ground.

As explained hereinbefore, if the speed of the vehicle should increase after the application of the dynamic brake, thereby causing the voltage of the motor 10 to increase sufficiently to operate the relay OV, the energizing circuit for the switch R1 is opened by the opening of the contacts of the relay OV. The deenergization of the switch R1 causes it to operate to reinsert the resistors 21 and 22 in the motor circuits. In this manner the motor current and voltage will be reduced to safe values, as illustrated by the curves in Fig. 3.

From the foregoing description it is apparent that I have provided a control system which affords protection for the traction motors of a vehicle against overloading and over-voltage at speeds which are higher than that for which the equipment on the vehicle is designed. The present system is particularly suitable for application on electric locomotives in which the dynamic braking system is designed for use only over a limited range of the speed at which the locomotive may be safely operated.

Since many modifications may be made in the apparatus and arrangement of parts without departing from the spirit of my invention, I do not wish to be limited other than by the scope of the appended claims.

I claim as my invention:

1. In a motor control system, in combination a motor, means for applying dynamic braking to the motor, means responsive to the motor speed for controlling the application of the dynamic brake, and means responsive to the motor voltage for decreasing the dynamic brake after its application.

2. In a motor control system, in combination, a motor, means for applying dynamic braking to the motor, relay means responsive to the motor speed for preventing the application of the dynamic brake above a predetermined speed, and additional relay means responsive to the motor voltage for decreasing the dynamic brake after its application.

3. In a motor control system, in combination, a motor, means for applying dynamic braking to the motor, and relay means responsive to the motor voltage for decreasing the dynamic brake after its application.

4. In a motor control system, in combination, a motor, means for establishing a dynamic braking circuit for the motor, control means for controlling the current in said dynamic braking circuit, means responsive to the motor speed for controlling the operation of said control means to control the application of the dynamic brake, and means responsive to the motor voltage for decreasing the dynamic braking effect.

5. In a motor control system, in combination, a motor, means for establishing a dynamic braking circuit for the motor, control means for controlling the current in said dynamic braking circuit, means responsive to the motor speed for controlling the operation of said control means to control the application of the dynamic brake, and means responsive to the motor voltage for controlling the operation of the dynamic brake after its application.

6. In a motor control system, in combination, a motor, means for establishing a dynamic braking circuit for the motor, control means for controlling the current in said dynamic braking circuit, and means responsive to the motor voltage for controlling the operation of said control means to decrease the dynamic braking effect.

7. In a motor control system, in combination, a motor, means for establishing a dynamic braking circuit for the motor, resistance means for controlling the current in the dynamic braking circuit, a plurality of switches for shunting the resistance means from the braking circuit, and relay means responsive to the motor speed for controlling the operation of said resistor shunting switches to prevent the application of the dynamic brake above a predetermined speed.

8. In a motor control system, in combination, a motor, means for establishing a dynamic braking circuit for the motor, resistance means for controlling the current in the dynamic braking circuit, a plurality of switches for shunting the resistance means from the braking circuit, relay means responsive to the motor speed for controlling the operation of said resistor shunting switches to prevent the application of the dynamic brake above a predetermined speed, and additional relay means responsive to the motor voltage for controlling the operation of said resistor shunting switches to increase the resistance in the braking circuit after the application of the dynamic brake.

9. In a motor control system, in combination, a motor, means for establishing a dynamic braking circuit for the motor, resistance means for controlling the current in the dynamic braking circuit, a plurality of switches for shunting the resistance means from the braking circuit, and relay means responsive to the motor voltage for controlling the operation of said resistor shunting switches to vary the resistance in the motor circuit after the application of the dynamic brake.

10. In a motor control system, in combination, a motor, means for establishing a dynamic braking circuit for the motor, resistance means for controlling the current in the dynamic braking circuit, a plurality of switches for shunting the resistance means from the braking circuit, and a relay responsive to the current in the braking circuit for preventing the operation of said resistor shunting switches to increase the dynamic braking effect above a predetermined speed of the motor.

11. In a motor control system, in combination, a motor, means for establishing a dynamic braking circuit for the motor, resistance means for controlling the current in the dynamic braking circuit, a plurality of switches for shunting the resistance means from the braking circuit, a relay responsive to the current in the braking circuit for preventing the operation of said resistor shunting switches to increase the dynamic braking effect above a predetermined speed of the motor, and an additional relay responsive to the motor voltage for controlling the operation of said resistor shunting switches to increase the resistance in the braking circuit after the application of the dynamic brake.

12. In a motor control system, in combination, a motor, a power conductor, switching means for connecting the motor to the power conductor, additional switching means for establishing a dynamic braking circuit for the motor upon the opening of said first named switching means, resistance means for controlling the current in the braking circuit, a plurality of switches operable in sequential relation to shunt the resistance means from the braking circuit step-by-step, and a relay responsive to the current in the braking circuit for preventing the starting of the sequential operation of the resistor shunting switches to apply dynamic braking above the predetermined speed of the motor.

13. In a motor control system, in combination, a motor, a power conductor, switching means for connecting the motor to the power conductor, additional switching means for establishing a dynamic braking circuit for the motor upon the opening of said first named switching means, resistance means for controlling the current in the braking circuit, a plurality of switches operable in sequential relation to shunt the resistance means from the braking circuit step-by-step, a relay responsive to the current in the braking circuit for preventing the starting of the sequential operation of the resistor shunting switches to apply dynamic braking above a predetermined speed of the motor, and an additional relay responsive to the motor voltage for controlling the operation of said resistor shunting switches after the application of the dynamic brake.

LYNN G. RILEY.